United States Patent
Kruglikov et al.

(10) Patent No.: US 6,205,448 B1
(45) Date of Patent: Mar. 20, 2001

(54) METHOD AND APPARATUS OF SYNCHRONIZING TWO COMPUTER SYSTEMS SUPPORTING MULTIPLE SYNCHRONIZATION TECHNIQUES

(75) Inventors: Vitaly Kruglikov, Mountain View; Roger Flores, Redwood City; Rob Haitani, San Jose; Monty Boyer, Saratoga; Ron Marianetti, Morgan Hill; Ain McKendrick, Menlo Park; Art Lamb, Tiburon, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/016,076

(22) Filed: Jan. 30, 1998

(51) Int. Cl.[7] .................................................. G06F 17/30
(52) U.S. Cl. ..................... 707/200; 707/202; 707/203; 709/248
(58) Field of Search ............................... 707/8, 200–205; 709/101, 105, 205, 248

(56) References Cited

U.S. PATENT DOCUMENTS

| | | | |
|---|---|---|---|
| 4,432,057 | 2/1984 | Daniell et al. | 364/300 |
| 4,807,182 | 2/1989 | Queen | 364/900 |
| 4,866,611 | 9/1989 | Cree et al. | 364/300 |
| 4,875,159 | 10/1989 | Cary et al. | 364/200 |
| 4,956,809 | 9/1990 | George et al. | 364/900 |
| 5,065,360 | 11/1991 | Kelly | 395/800 |

(List continued on next page.)

OTHER PUBLICATIONS

Cobb et al., "Paradox 3.5 Handbook 3rd Edition", Bantam (1991), pp.803–816.
Alfieri, "The Best Book of: WordPerfect Version 5.0", Hayden Books (1988), pp. 153–165 and 429–435.
User Manual for PC–Link for the B.O.S.S. and the PC–Link for the B.O.S.S., Traveling Software, Inc. (1989).
User Manual for Connectivity Pack for the HP 95LX, Hewlett Packard Company (1991).
Organizer Link II Operation Manual, Sharp Electronics Corporation, No Date.
"Open Network Computing–Technical Overview," Sun Technical Report, Sun Microsystems, Inc. pp. 1–32 (1987).
Zahn et al., Network Computing Architecture, pp. 1–11, 19–31; 87–115; 117–133; 187–199; 201–209 (1990).
IntelliLink Brochure (1990).
"Logical Connectivity: Applications, Requirements, Architecture, and Research Agenda," Stuart Madnick & Y. Richard Wang, MIT, System Sciences, 1991, Hawaii Int'l, vol. 1, IEEE, Jun. 1991.
"Automatically Synchronized Objects", Research Disclosure #29261, p. 614 (Aug. 1988). No copy available.
"FRx extends reporting power of Platinum Series: (IBM Destop Software's line of accounting software)", Doug Dayton, PC Week, v. 8, No. 5, p. 29(2), Feb. 1991.

*Primary Examiner*—Hosain T. Alam
(74) *Attorney, Agent, or Firm*—Wilson Sonsini Goodrich & Rosati

(57) ABSTRACT

A method and system of synchronizing two computer systems supporting multiple synchronization techniques is described. In one example system, a portable computer system is loaded with synchronization transport modules. An application on the portable computer system is executed causing the application to automatically recognize the synchronization transport modules. The portable computer system receives a selection corresponding to one of the two synchronization transport modules. The selection could be from a user and would indicate that the user prefers to synchronize with the second computer system using a particular method of external communication. After the selection, the portable computer system synchronizes with the other computer system using the selected method of external communication.

10 Claims, 11 Drawing Sheets

U.S. PATENT DOCUMENTS

| | | | |
|---|---|---|---|
| 5,142,619 | 8/1992 | Webster, III | 395/157 |
| 5,187,787 | 2/1993 | Skeen et al. | 395/600 |
| 5,210,868 | 5/1993 | Shimada et al. | 395/600 |
| 5,237,678 | 8/1993 | Kuechler et al. | 395/600 |
| 5,251,291 | 10/1993 | Malcolm | 395/146 |
| 5,261,045 | 11/1993 | Scully et al. | 395/161 |
| 5,261,094 | 11/1993 | Everson et al. | 395/600 |
| 5,272,628 | 12/1993 | Koss | 364/419.19 |
| 5,283,887 | 2/1994 | Zachery | 395/500 |
| 5,301,313 | 4/1994 | Terada et al. | 395/600 |
| 5,315,709 | 5/1994 | Alston, Jr. et al. | 395/600 |
| 5,327,555 | 7/1994 | Anderson | 395/600 |
| 5,333,252 | 7/1994 | Brewer, III et al. | 395/148 |
| 5,339,392 | 8/1994 | Risberg et al. | 395/161 |
| 5,339,434 | 8/1994 | Rusis | 395/700 |
| 5,355,476 | 10/1994 | Fukumura | 395/600 |
| 5,392,390 | 2/1995 | Crozier | 395/161 |
| 5,434,994 | 7/1995 | Shaheen et al. | 395/500 |
| 5,475,833 | 12/1995 | Dauerer et al. | 395/600 |
| 5,519,606 | 5/1996 | Frid-Nielsen et al. | 364/401 |
| 5,640,566 * | 6/1997 | Victor et al. | 395/701 |
| 5,666,553 | 9/1997 | Crozier | 395/803 |
| 5,684,990 | 11/1997 | Boothby | 395/619 |
| 5,701,423 | 12/1997 | Crozier | 345/335 |
| 5,710,922 * | 1/1998 | Alley et al. | 707/201 |
| 5,900,875 * | 5/1999 | Haitani et al. | 345/349 |
| 5,974,238 * | 10/1999 | Chase, Jr. | 709/248 |
| 6,006,274 * | 12/1999 | Hawkins et al. | 709/248 |

* cited by examiner

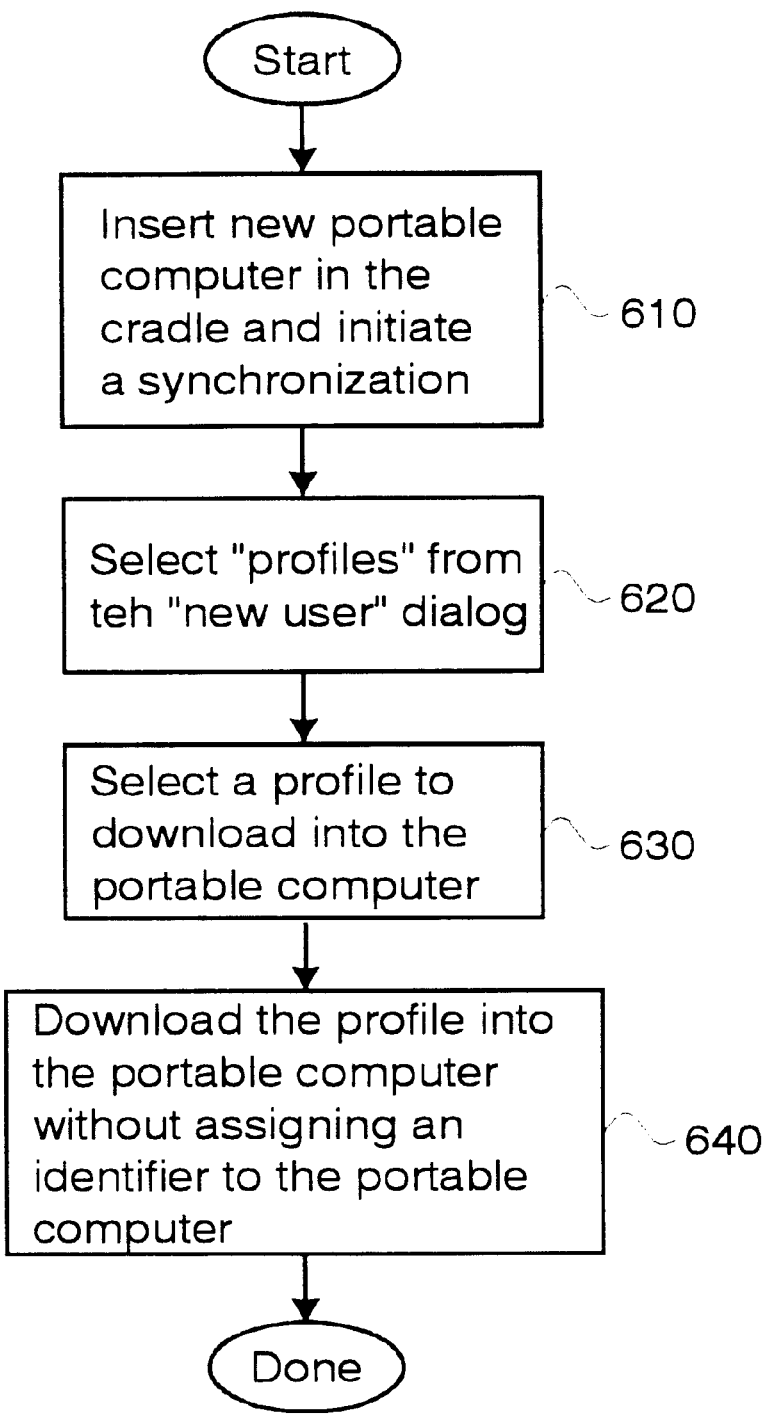

METHOD AND APPARATUS OF SYNCHRONIZING TWO COMPUTER SYSTEMS SUPPORTING MULTIPLE SYNCHRONIZATION TECHNIQUES

FIELD OF THE INVENTION

The present invention relates to the field of portable computer systems. In particular the present invention discloses improved methods for synchronization of two different computer systems.

BACKGROUND OF THE INVENTION

Portable computer systems have become valuable information appliances that provide important information whenever and wherever the user needs it. It has become apparent that one of the most important features of portable computer systems is the ability to share data with larger desktop personal computers. Several earlier patents such as "Method And Apparatus for Synchronizing Information On Two Different Computer Systems" filed Oct. 18, 1995 with Ser. No. 08/544,927, now U.S. Pat. No. 5,727,202 "Extendable Method And Apparatus For Synchronizing Multiple Files On Two Different Computer Systems" filed Oct. 13, 1995 with Ser. No. 08/542,055, now U.S. Pat. No. 5,884,323 and "Method And Apparatus for Synchronizing A Portable Computer System With a Desktop Computer System" filed Jan. 30, 1997 with Ser. No. 08/792,166, now U.S. Pat. No. 6,006,274 have addressed some of the issues involved in the synchronization of two different computer systems.

As the portable computer systems have been put to use out in the field, some drawbacks in the current synchronization procedures have been identified. It would therefore be desirable to improve the synchronization methods used with portable computer systems.

BRIEF DESCRIPTION OF THE DRAWINGS

The objects, features and advantages of the present invention will be apparent to one skilled in the art, in view of the following detailed description in which:

FIG. 6 illustrates a flow diagram describing how profile is downloaded into a portable computer system.

DETAILED DESCRIPTION OF THE PREFERRED EMBODIMENT

A method and apparatus for synchronizing two different computer systems is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to synchronization between a portable computer system and a desktop personal computer system. However, the same techniques can easily be applied to other types of computer devices.

General Synchronization System Architecture

Figure 1:
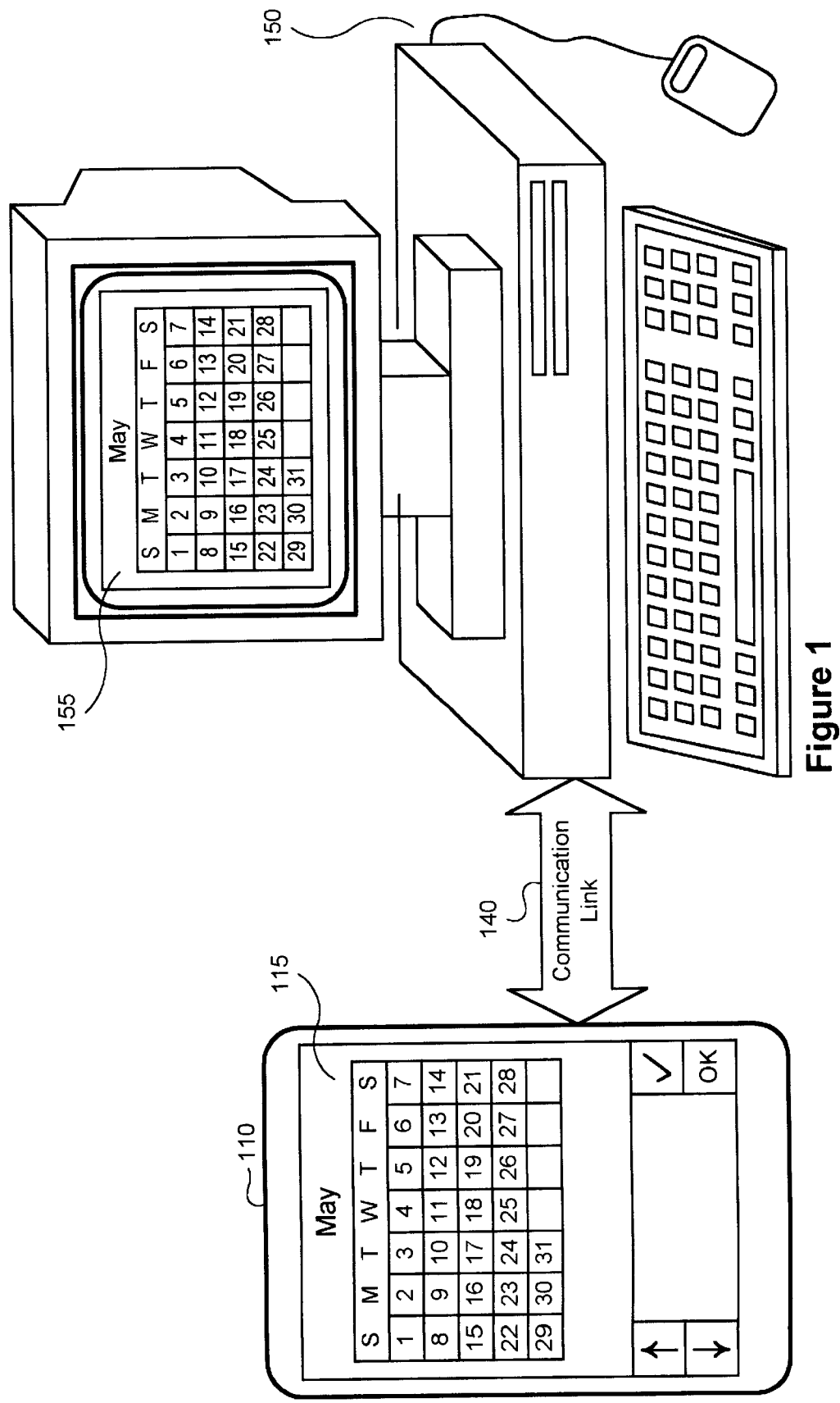
FIG. 1 illustrates a conceptual diagram of computer synchronization system between a portable system 110 and a personal computer system 150.

FIG. 1 illustrates a conceptual diagram of computer synchronization system between a portable system 110 and a personal computer system 150. The portable computer system 110 may be any type of small microprocessor based computer system such as a cellular phone or a handheld personal information manager.

In FIG. 1 both the handheld computer system 110 and the personal computer system 150 are running calendar program. With a synchronization system, the user can alter the data on both the calendar program 115 and on the handheld computer system 110 or the data on the desktop personal computer system calendar program 155 on the personal computer system 150. Then, at some later point, the user should be able to reconcile the two different calendar databases by coupling the two computer system together using communication link 140 and requesting a synchronization. The synchronization process combines the data from the modified personal computer calendar 155 and the data from the modified hand held calendar 115 into a single reconciled calendar. The reconciled calendar is then placed into both the handheld computer system 110 and the personal computer system 150.

Details on implementing a basic synchronization system are set forth in the patents "Method And Apparatus for Synchronizing Information On Two Different Computer Systems" filed Oct. 18, 1995 with Ser. No. 08/544,927, now U.S. Pat. No. 5,727,202 "Extendable Method And Apparatus For Synchronizing Multiple Files On Two Different Computer Systems" filed Oct. 13, 1995 with Ser. No. 08/542,055, now U.S. Pat. No. 5,884,323 and "Method And Apparatus for Synchronizing A Portable Computer System With a Desktop Computer System" filed Jan. 30, 1997 with Ser. No. 08/792,166, now U.S. Pat. No. 6,006,274 which are hereby incorporated by reference.

Random Number Generation

To simplify the synchronization process, each record on both the personal computer system and the portable computer system has an identification number. Corresponding records on the personal computer system and the portable computer system will have matching identification numbers. Thus, to quickly locate corresponding records during a synchronization, the synchronization program only needs to find records having matching identification numbers.

Referring to the synchronization system of FIG. 1, it is apparent that in the time between synchronizations, new records may be created on both the personal computer system and the portable computer system. To prevent an incorrect correlation, new unique record identifiers must be assigned to new records created on either system. To prevent the same record identifier from being created on both the personal computer system and the portable computer system, a series of random numbers are needed for both systems. Methods of generating a series of random numbers exist, however an initial random number seed is required. Thus, a robust random number seed is needed for both the portable and desktop computer systems.

There are many known methods of generating random number seeds on personal computers such as counting the time that passes between successive keystrokes. However, in a pen based portable computer system, it is not as easy to generate random numbers. The problem is compounded by the fact that the very first action which a user may perform after turning on a portable computer system is to enter a new record to store a recently acquired information phone number or a new appointment.

Figure 2:
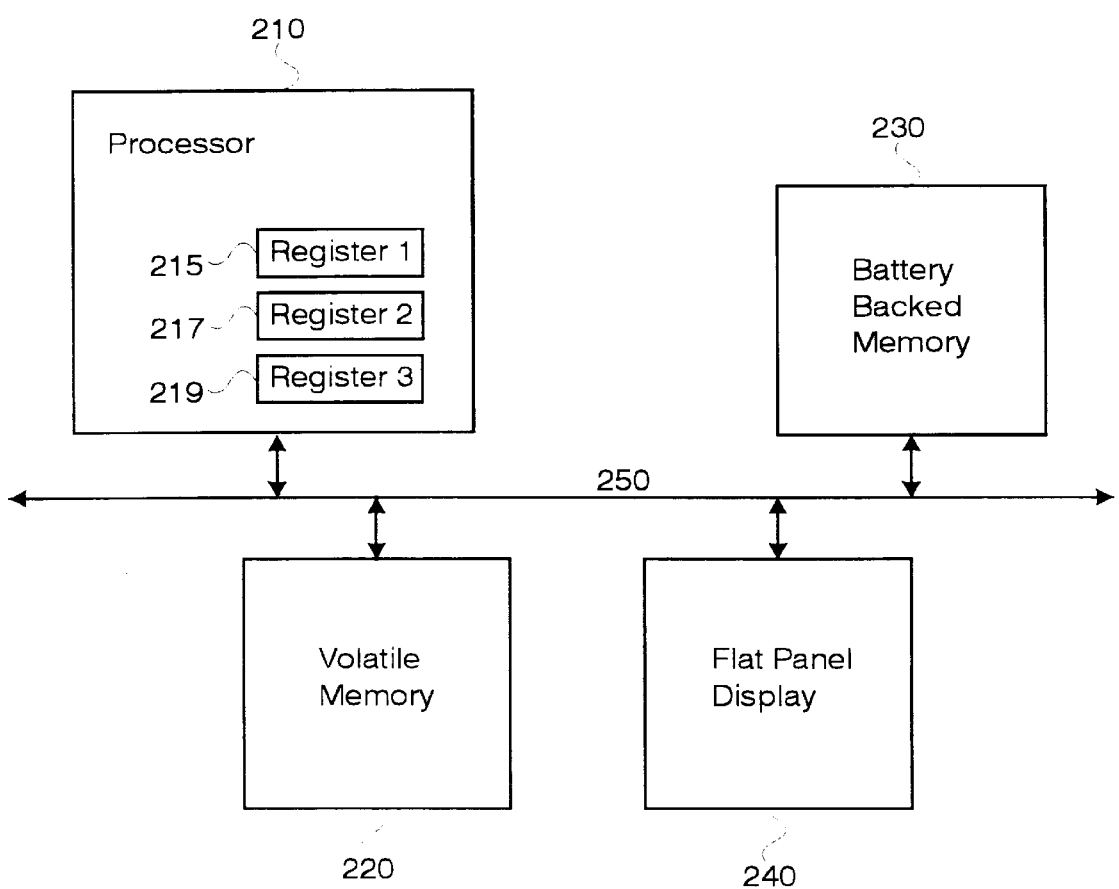
FIG. 2 illustrates a conceptual diagram of a typical computer operating system.

The present invention proposes a method of generating random numbers in such a portable computer system. Referring to FIG. 2, a block diagram of one possible embodiment of a portable computer system is illustrated. Referring to the block diagram of FIG. 2, the portable computer system includes a main processor for performing processing instructions. The processor is coupled to volatile memory system, a battery backed memory system, and a display through a computer bus.

When the portable computer is turned off, the contents of the battery backed memory is retained for future reference. Other implementations may use flash memory to store information when the portable computer system is turned off. However, the contents of the volatile memory begin to decay once the portable computer system is turned off. When the portable computer is turned back on, the volatile memory will contain modified version of what volatile memory contained when the battery was turned off. Since different memory cells decay at different rates, the contents of the volatile memory will be somewhat random. If a sufficient number of locations from the volatile memory are logically combined, then a random value can be created. One method of logically combining the data would be to exlcusive-OR (XOR) the data together. Another method of creating a random value would be to add the data together such that overflows create a random pattern in the accumulator. To further randomize the value, the contents of the processor's internal registers can be combined to generate a final random number seed.

In one embodiment of a portable computer system, all the memory is battery backed such that there is no memory decay to cause random values. In such a system, an area of memory that is used to store temporary variables can be used to provide semi-random values. Specifically, an area of memory that is used to store temporary values is defined as "dynamic memory." The dynamic memory area is shared by all the different applications. Since area is shared by several different applications and stores miscellaneous temporary variables, its contents are semi-random. This semi-random area of memory can be logically combined to produce a random seed.

Figure 3:
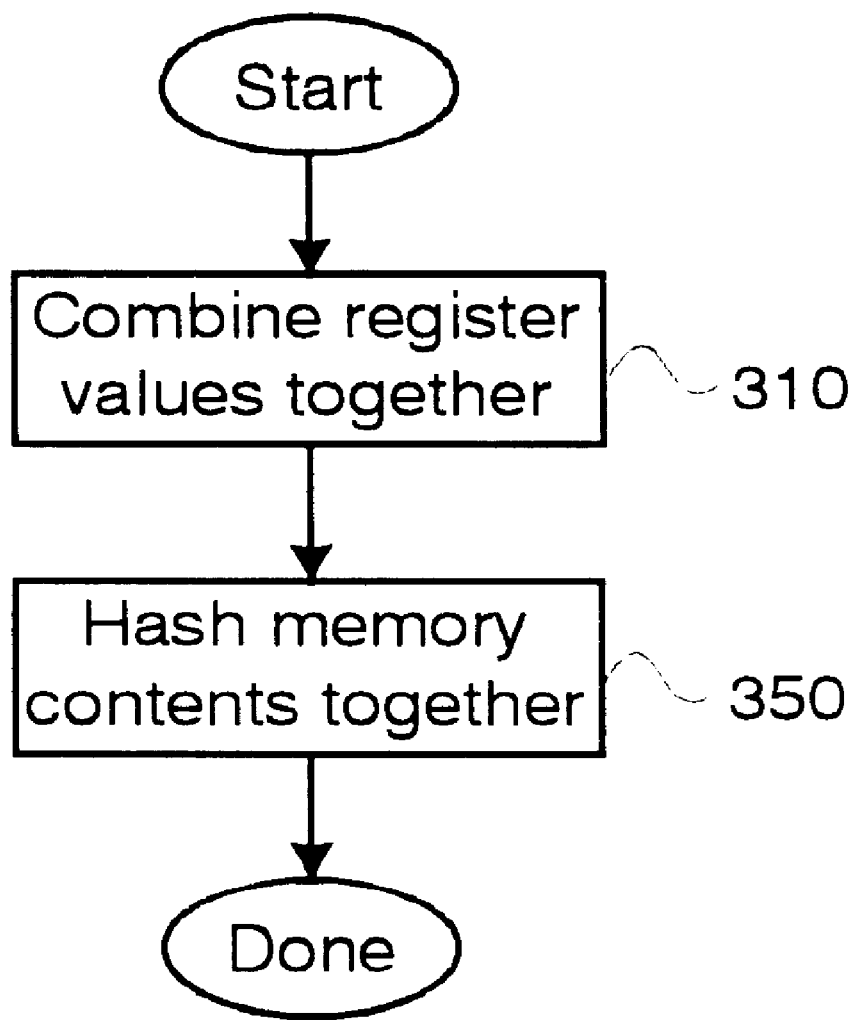
FIG. 3 illustrates a flow diagram describing a method of generating a random number seed.

FIG. 3 illustrates a summary of a method of generating a random number seed in a portable computer system that has just been turned on. First, the contents of the processor's internal register are logically combined. (The registers are combined first such that their initial state at power up is preserved. Next, the register-based value is then logically combined with the contents of a portion of the memory that contains semi-random values. The result is a random number seed that can be used to generate a series of random numbers. In one embodiment, the random number seed is only initialized after a processor reset. All subsequent random numbers are created by applying a random number algorithm to the random number seed.

Synchronization Profiles

When a company adopts a particular computer technology for company wide usage, system administrators need tools to quickly configure the newly adopted computer technology. For example, when a new program is adopted for use on companies personal computers, system administrator desire the ability to install and configure the new program across the company's local area network (LAN).

The same principal applies to portable computer systems. When a company adopts a portable computer system for company-wide usage, system administrators need to be able to quickly configure such portable computer systems. The present invention introduces the concept of a "user profile" for allowing a number of portable computer systems to be initialized with the same information.

Figure 4:
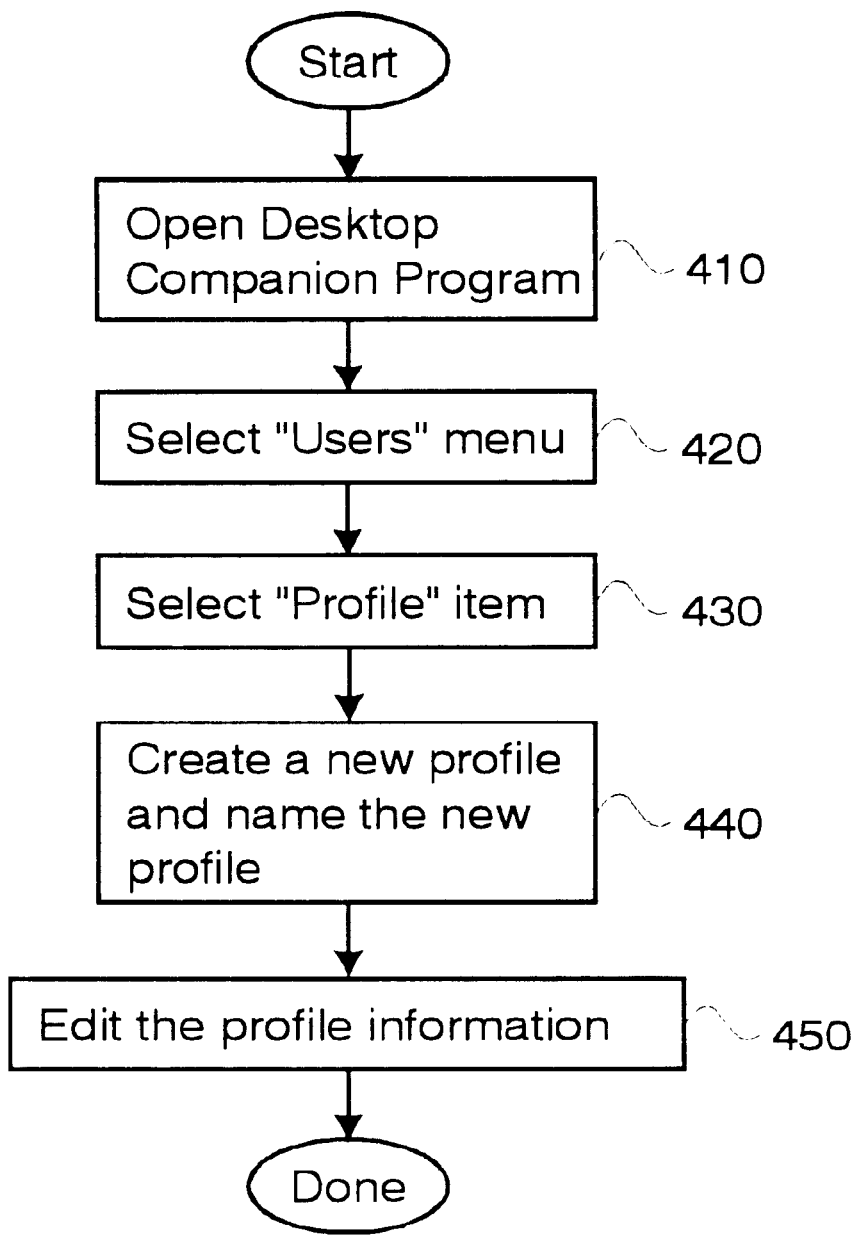
FIG. 4 illustrates a flow diagram describing a method of creating a portable computer profile.

FIG. 4 describes the steps of setting up a user profile. Initially, the system administrator opens up a desktop companion program on a personal computer system. The administrator then selects a "users" menu where new users may be created. Instead of creating a new user, the administrator selects a button for "profiles" to open a profiles dialog.

Figure 5A:
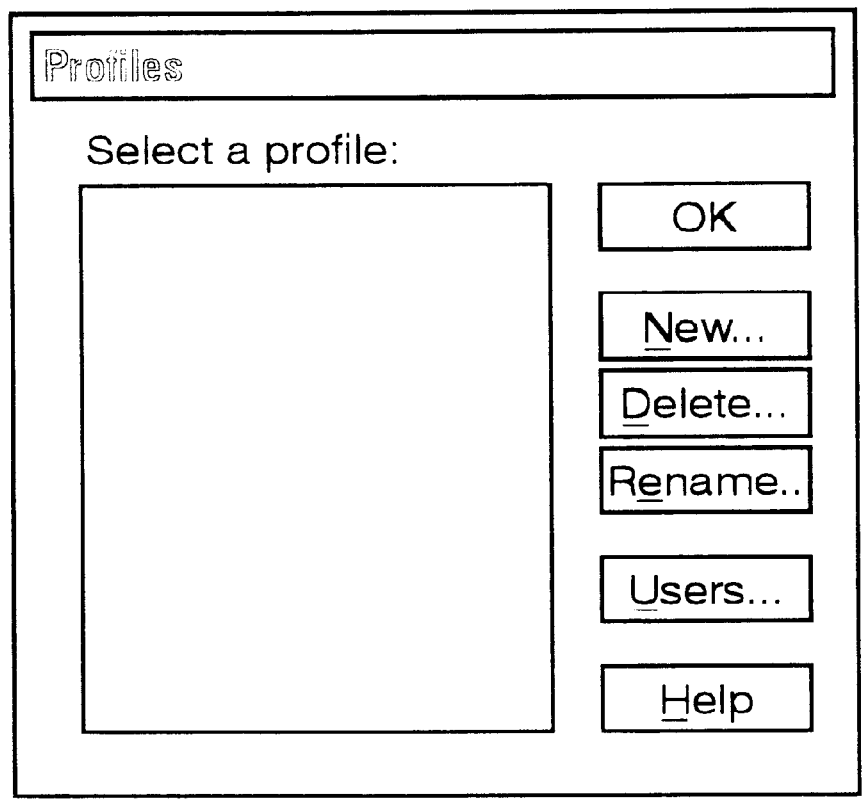
FIG. 5A illustrates a diagram of a graphical user interface dialog box for modifying profiles.
Figure 5B:
FIG. 5B illustrates a diagram of a graphical user interface dialog box for creating a new profile.

FIG. 5A illustrates one possible embodiment of a profiles dialog box. The profiles dialog box allows profiles to be created (new), renamed, and deleted. (The Users button allows the user to move directly to the dialog box listing all the known users if that is what the user really wanted.) Referring to FIGS. 4 and 5, the user selects the new button to create a new profile. This causes a pop-up dialog box to request a name for the new profile as illustrated in FIG. 5B. A name (such as "salesperson profile") is entered and a new empty profile is created with that name. A profile is very similar to a user in that it is associated with a set of data files used during synchronization except that profile is not associated with any specific user or portable computer system.

The system administrator then returns to the main desktop companion program and edits the information associated with the new profile. Information from existing users can be copied into the new user profile. For example, if the system administrator has already entered all the company phone numbers into his own account, he can copy the address information from his own address database into a address database associated with the profile. Furthermore, information can be imported from external sources into the profile database. Thus, if the system administrator has a list of the company's customers, this customer database can be imported into the profile for sales people.

After a profile has been created, the profile can be used to initialize new portable computer systems before the portable computer systems are distributed to end users. FIG. 6 illustrates a flow diagram that describes how new portable computers are initialized. First, the system administrator places the new portable computer system in a synchronization cradle connected to the personal computer storing the profile and requests a synchronization. Since the portable computer system has not been used, a "new user" dialog box will request a name for the new portable computer system. Instead of entering a new name, the system administrator selects a "profiles" button that brings up a profile dialog box. The system administrator then selects the profile to download into the portable computer. The personal computer then downloads all the information associated with the profile into the portable computer. However, no name is assigned to the portable computer system. In one embodiment, the profile information may include specific configuration information such as network configuration and dial-up numbers as well as the set of preloaded databases such as the company's telephone directory. The preconfigured portable computer system can then be give to a user. It should be noted that several portable computer systems may be initialized using the same profile.

When a user that receives a preconfigured portable computer system first synchronizes the portable computer system with a personal computer system, the new user dialog will appear since no name was associated with the portable computer system.

Synchronization Control

As set forth in the patent "Extendable Method And Apparatus For Synchronizing Multiple Files On Two Different Computer Systems" filed Oct. 13, 1995 with Ser. No. 08/542,055 now U.S. Pat. No. 5,884,323 a synchronization system is can be designed wherein different applications or databases are synchronized using individually tailor synchronization "conduits." However, it has been determined that not all the installed conduits should be handled in the exact same manner.

Figure 7:
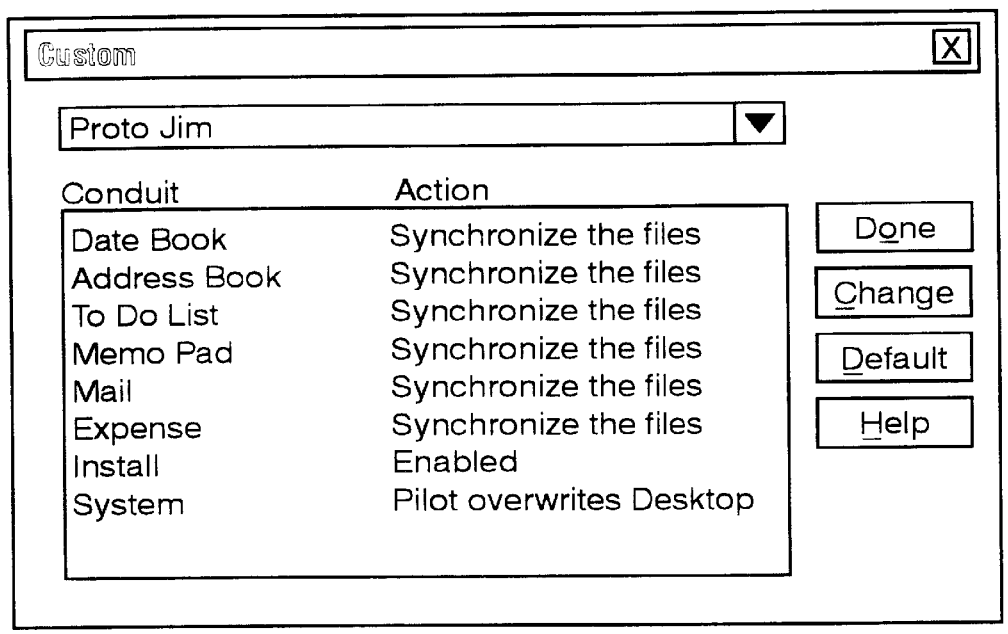
FIG. 7 illustrates a diagram of a graphical user interface dialog box for modifying conduits.

A revised synchronization system has been proposed wherein each conduit may be treated differently. Specifically, a user may adjust the conduit execution to suit his individual needs. To adjust the conduit execution, the user opens a custom synchronization control dialog box as illustrated in FIG. 7. The custom synchronization control dialog allows a user to change the synchronization control of an individual conduit or to restore default synchronization settings. To modify the behavior of a specific conduit, the user selects the conduit and selects the "change" button to bring up a conduit change dialog.

Figure 8:
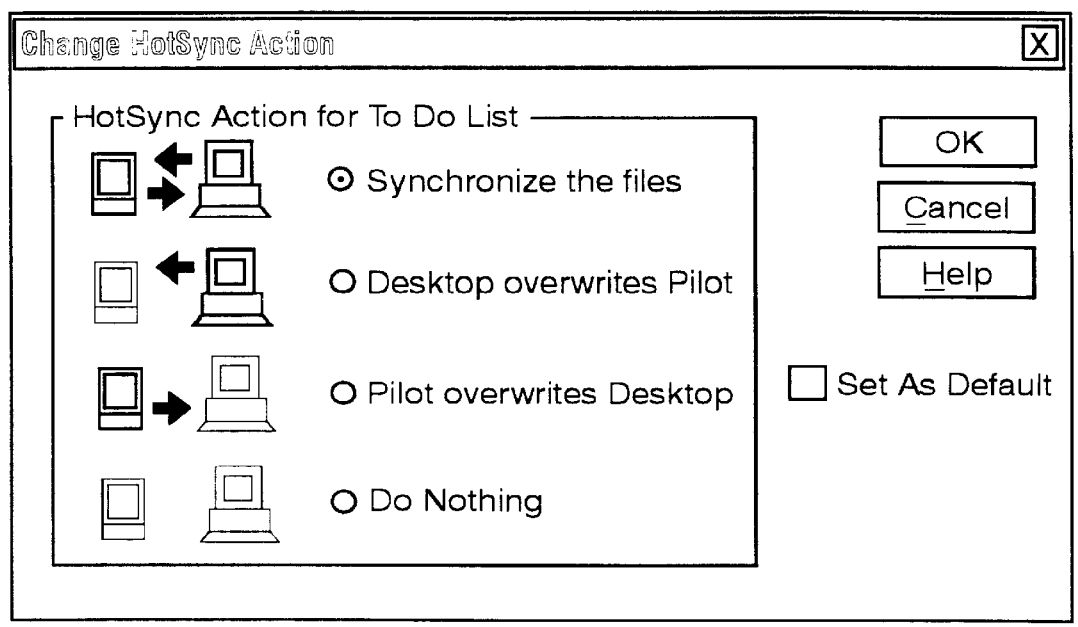
FIG. 8 illustrates a diagram of a graphical user interface dialog box for setting conduit behavior.

FIG. 8 illustrates one possible conduit change dialog box. The change dialog box allows the conduit to behave in four different ways: synchronization, desktop overwrite, portable overwrite, and inactive. The synchronization setting is the default method of operation wherein the corresponding databases on both the desktop and portable are reconciled. The desktop overwrite setting allows the contents of the desktop personal computer database for the that particular conduit to overwrite the portable computer's database. That setting would be useful if all updates to that particular database are performed on the desktop personal computer. The portable computer overwrite setting is the opposite wherein the contents of the portable computer system overwrites the desktop personal computer. Finally, the inactive setting prevents that particular conduit from executing. This is useful when the user is not using the associate application. By not performing executing a conduit, the synchronization time will be reduced and memory space will be saved.

Referring to FIG. 8 it should be noted that there is a "set as default" check box. If the a "set as default" check box is selected when modifying a conduit's behavior, then the conduit's behavior will be modified for every future synchronization. However, if the a "set as default" check box is not selected, then the modification to the conduit's behavior will only affect the next synchronization. After the first synchronization, the conduit will revert back to the default "synchronize" setting. This feature is useful if a user wishes to do a one time load of a fresh database, but then synchronize the two databases in every future synchronization.

As set forth in the patent "Method And Apparatus for Synchronizing A Portable Computer System With a Desktop Computer System" filed Jan. 30, 1997 with Ser. No. 08/792,166, now U.S. Pat. No. 5,006,274 the portable computer system can be synchronized with a desktop personal computer system across a telephone line. This can be performed by directly connecting to the desktop personal computer with a modem or connecting to the desktop computer through a LAN connection made with a modem-based PPP connection. In such a situation, the speed of the synchronization will be limited by the modem communication speed. To minimize the synchronization time, the present invention also provides a method of altering the synchronization behavior when the synchronization is being performed across a modem link. This feature is configured on the portable computer system since the remote desktop personal computer is not accessible.

Figure 9:
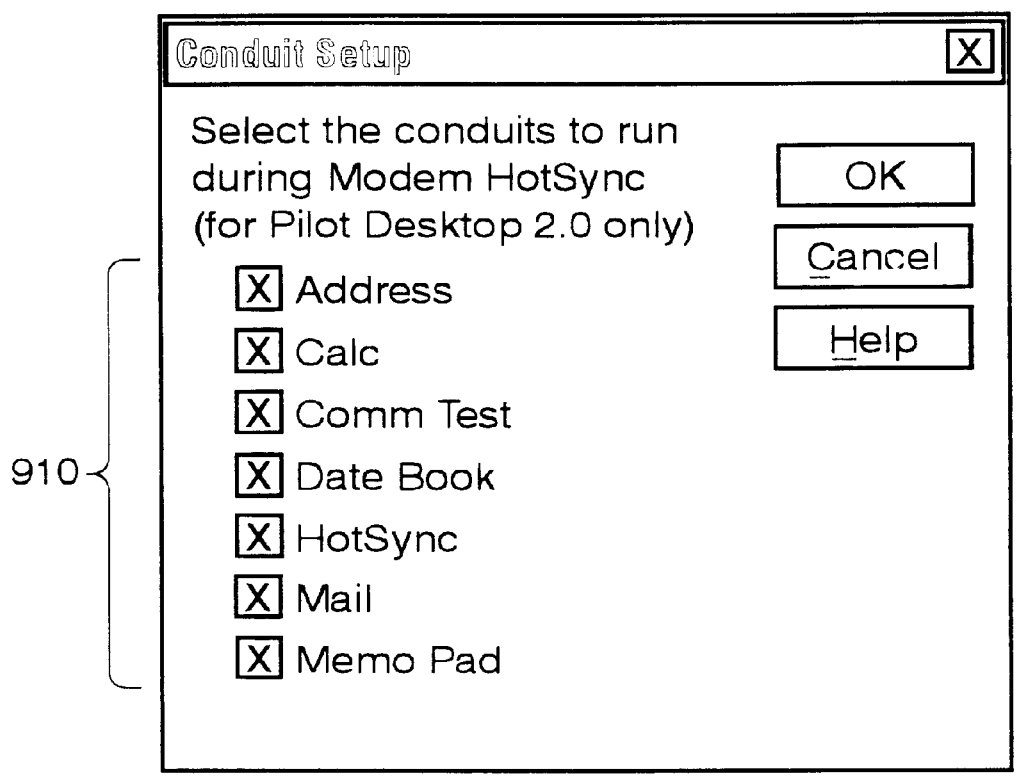
FIG. 9 illustrates a diagram of a screen display for setting conduit behavior on a portable computer system.

FIG. 9 illustrates a modem synchronization configuration screen that may be displayed on a portable computer system. The configuration screen of FIG. 9 allows the user to select which conduits will be executed during a modem based synchronization. When a remote synchronization begins, the remote desktop personal computer will query the portable computer system as to which Thus, the user can shorten time needed to perform a synchronization by only selecting the conduits that synchronized the desired information.

Remote Dialog Box Dismissing

As described in the previous section, a portable computer can be remotely synchronized with a desktop personal computer system using a modem. Alternatively, a portable computer may also remotely synchronize with a desktop personal computer system across a LAN using network protocols. In both situations, the user is physically far from the desktop personal computer.

In the patent "Extendable Method And Apparatus For Synchronizing Multiple Files On Two Different Computer Systems" filed Oct. 13, 1995 with Ser. No. 08/542,055, now U.S. Pat. No. 5,884,323 the main synchronization control program resides on the desktop personal computer. If a problem occurs during the synchronization, the synchronization control program will normally display a dialog box on the desktop personal computer. However, if the portable computer user is synchronizing from a remote location, the user will not be able to respond to dialog boxes displayed on the remote personal computer system.

To prevent a deadlock due to dialog boxes that are not acted upon, the present invention introduces dynamic dialog boxes. Such dynamic dialog boxes are designed to automatically dismiss themselves if there is no response within a predetermined time period. To dismiss itself, a dynamic dialog box sets a timer that will execute a callback routine in the dialog box. If a dialog box is not dismissed by a user at the desktop personal computer, then the timer will eventually pop and the callback routine will dismiss the dialog box. If the dialog box is dismissed by a user, then the timer that was set will be killed.

Synchronization Transport Adaptation Layer

Different users of portable computer systems synchronize their portable computers with personal computers in different ways. For example, one user may always synchronize their portable computer with their desktop personal computer using a cradle coupled to the desktop personal computer. Another user may always be travelling and synchronizes with his desktop personal computer using a modem or a direct connection through a computer network. Yet another user may wish to synchronize using an infrared port that are available on both the portable computer system and the desktop personal computer. In the future, wireless packet radio networks may become pervasive allowing a new method of remote synchronization to become available. To accommodate all these different synchronization methods, the present invention introduces a synchronization transport adaptation layer.

Figure 10:
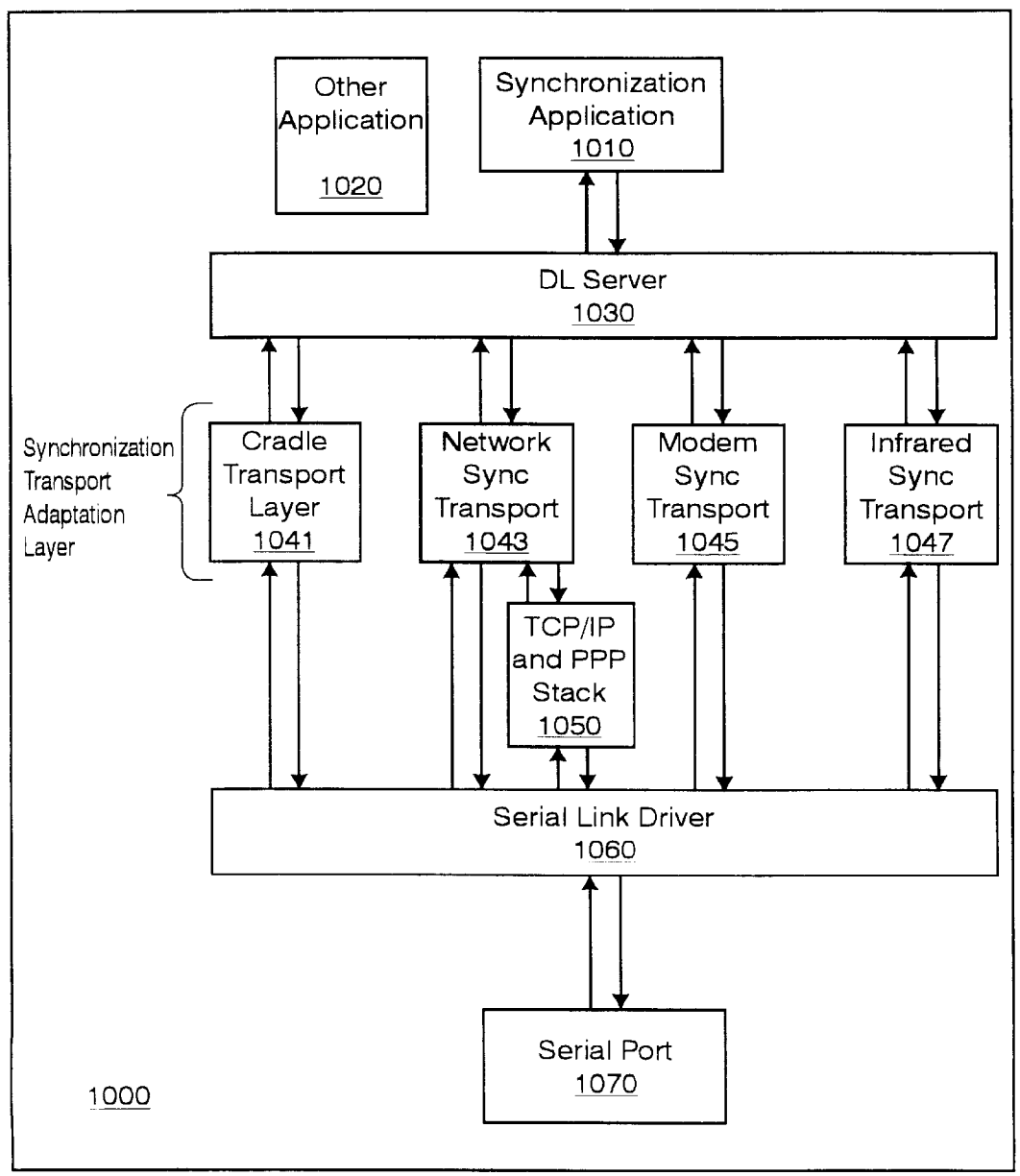
FIG. 10 illustrates the software architecture of a portable computer system with an expandable synchronization transport adaptation layer.

The synchronization transport adaptation layer provides a single consistent interface between a synchronization program residing on a portable computer system and a plurality of different methods of external communication. FIG. 10 illustrates the architecture of a portable computer system implementing a synchronization transport adaptation layer.

Referring to FIG. 10, the synchronization application communicates with a DL server (Desktop link server) that acts as a single unified communication interface for the synchronization application. The DL server communicates a plurality of different synchronization transport adaptation layers. Each synchronization transport adaptation layer handles communication for a specific type of communication means.

The architecture is designed such that the synchronization transport adaptation layer is expandable. Specifically, when the Synchronization application is executed, the synchronization layer examines the creatorID and type of each application installed on the portable computer system to determine if the application is a synchronization transport adaptation layer module. Thus, the synchronization program generates a list of all the synchronization transport adaptation layer modules.

The synchronization program then queries each synchronization transport adaptation layer module to determine which applications can create "services" for that particular synchronization transport adaptation layer module (service creators). A service is defined as a set of configuration parameters need to establish a connection with a particular synchronization transport adaptation layer module. The service creator is used to create a set of configuration parameters for a synchronization transport adaptation layer module. For example, a service for a network synchronization transport module would include the hostname and IP address of the desktop personal computer to synchronize with. The service could be created by a preferences program that is used to configure several different portable computer parameters.

After learning which applications may create services for each synchronization transport adaptation layer module (the service creators), the synchronization program queries all the service creators to obtain a list of the available services. After obtaining a list of all the available services for all of the available synchronization transport adaptation layer modules, the synchronization program displays a list of the available synchronization transport adaptation layer modules and their respective services. The user can then select which synchronization transport adaptation layer module and service to use when a synchronization is to be performed.

Referring to FIG. 10, a first synchronization transport adaptation layer module is a cradle transport. The cradle transport handles synchronization directly between a serial port on the portable computer system and a serial port on the desktop computer system.

The second synchronization transport is a network synchronization transport. The network synchronization transport handles synchronization directly between the portable computer system and a desktop computer system using TCP/IP networking. The network synchronization use a TCP/IP on a host personal computer system to connect with a target desktop personal computer connected across a computer network. Alternatively, the network synchronization may use a TCP/IP and PPP stack on the portable computer such that a modem connected to the serial port of the portable computer system establishes a PPP link with TCP/IP network coupled to the target desktop computer system. Specific information on network synchronization can be found in the U.S. patent application "Method And Apparatus for Synchronizing A Portable Computer System With a Desktop Computer System" filed Jan. 30, 1997 with Ser. No. 08/792,166, now U.S. Pat. No. 6,006,274 which is hereby incorporated by reference.

If an infrared device is coupled to the serial port of the portable computer system then the synchronization application can use the infrared synchronization transport module. The infrared synchronization transport module implements the necessary IrDA standards needed to communicate with a personal computer having an IrDA compliant infrared port.

Synchronization Password Protection

The information stored within a person's desktop personal computer is very valuable. Of particular relevance to the present invention, the personal contact and calendar information stored within a desktop personal computer is very valuable. The personal contact and calendar information is also very personal such that a user may not want others to be able to steal this information.

One method of stealing the personal contact and calendar information from a personal computer would be to attempt synchronizing an empty portable computer system with the personal computer system. The synchronization program on the personal computer would then inform the user that portable computer is empty and that a new user can be created or the name of an existing user can be used. The reason for allowing the use of an existing user is to restore data lost from a portable computer due to batteries running out or damage to the portable computer. An unscrupulous person may attempt to steal a persons existing data by requesting such a restoration.

To prevent stealing data in such a manner, a user may associate a password with the data stored on a personal computer. Thus, when a person attempts to restore information from an existing user back onto a portable computer, the desktop synchronization will require the password associated with that user. Thus, the theft of personal data would not be possible without the user's password.

The foregoing has described methods for synchronizing a portable computer system with a desktop computer system. It is contemplated that changes and modifications may be made by one of ordinary skill in the art, to the materials and arrangements of elements of the present invention without departing from the scope of the invention.

We claim:

1. A method of synchronizing a first computer system with a second computer system, said method comprising:

installing a first synchronization transport module to said first computer system;

installing a second synchronization transport module to said first computer system;

executing a synchronization application on said first computer system, said synchronization application automatically recognizing said first synchronization transport module and said second synchronization transport module;

receiving a selection of an active synchronization transport module from at least said first synchronization transport module and said second synchronization transport module; and synchronizing said first computer system with said second computer system using said active synchronization transport module.

2. The method as claimed in claim 1, said method further comprising:

configuring said first synchronization transport module by executing said first synchronization transport module.

3. The method as claimed in claim 1, said method further comprising:

configuring said first synchronization transport module by executing a preferences program that modifies configuration parameters associated with said first synchronization transport module.

4. The method as claimed in claim 1, said method further comprising, prior to the synchronizing:

installing a third synchronization transport module to said first computer system;

executing said synchronization application on said first computer system, said synchronization application automatically recognizing said first synchronization transport module, said second synchronization transport module, and said third synchronization transport module;

receiving a second selection of said active synchronization transport module from at least said first synchronization transport module, said second synchronization transport module, and said third synchronization transport module.

5. The method as claimed in claim 4, wherein said first computer system includes a portable computer system, wherein said second computer system includes a desktop computer system, and where said first, second and third synchronization transport modules correspond to a cradle communications method, a network communications method, and a modem communications method, respectively.

6. The method as claimed in claim 1, wherein said first computer system includes a portable computer system and wherein said second computer system includes a desktop computer system.

7. A portable computer comprising:

a set of installed synchronization transport modules, each synchronization transport module corresponding to a different external communication method;

at least a first service creator application to create a set of services, each service corresponding to a set of configuration parameters for a corresponding installed synchronization transport module;

a user interface for receiving a selection of a synchronization transport module and a service; and a synchronization application to automatically detect the set of installed synchronization transport modules, and to synchronize the portable computer using the selected synchronization transport module and the selected service.

8. A system for synchronizing a first computer system with a second computer system, the system comprising:

a means, in the first computer system, for storing a first synchronization transport module and a second synchronization transport module;

a means, in the first computer system, for automatically recognizing the first synchronization transport module and the second synchronization transport module;

a means for receiving a selection of an active synchronization transport module from the first synchronization transport module and the second synchronization transport module; and a means for synchronizing the first computer system with the second computer system using the active synchronization transport module.

9. The system as claimed in claim 8, the system further comprising:

a means for configuring the first synchronization transport module by executing the first synchronization transport module.

10. The system as claimed in claim 8, the system further comprising:

a means for configuring the first synchronization transport by modifying configuration parameters associated with the first synchronization transport module.

* * * * *

UNITED STATES PATENT AND TRADEMARK OFFICE
CERTIFICATE OF CORRECTION

PATENT NO. : 6,205,448 B1　　　　　　　　　　　　　　　　　　　　　　　Page 1 of 1
DATED : March 20, 2001
INVENTOR(S) : Kruglikov, et al.

It is certified that error appears in the above-identified patent and that said Letters Patent is hereby corrected as shown below:

<u>Title page, item [54],</u>
Title: METHOD AND APPARATUS OF SYNCHRONIZING TWO COMPUTER SYSTEMS SUPPORTING MULTIPLE SYNCHRONIZATION TECHNIQUES BY USING SYNCHRONIZATION TRANSPORT MODULES Signed and Sealed this Thirtieth Day of October, 2001

*Attest:*

*Attesting Officer*　　　　　NICHOLAS P. GODICI
　　　　　　　　　　　*Acting Director of the United States Patent and Trademark Office*